United States Patent
Zhang (10) Patent No.: US 9,822,036 B2
(45) Date of Patent: Nov. 21, 2017

(54) RAPID-SETTING AND HARDENING, HIGH-BELITE SULFOALUMINATE CEMENT CLINKER AS WELL AS APPLICATION AND PRODUCTION PROCESS THEREOF

(71) Applicant: Tangshan Polar Bear Building Materials Co., Ltd., Tangshan (CN)

(72) Inventor: Zhenqiu Zhang, Tangshan (CN)

(73) Assignee: Tangshan Polar Bear Building Materials Co., Ltd., Tangshan (CN)

( * ) Notice: Subject to any disclaimer, the term of this patent is extended or adjusted under 35 U.S.C. 154(b) by 0 days.

(21) Appl. No.: 15/119,688

(22) PCT Filed: Jan. 9, 2015

(86) PCT No.: PCT/CN2015/070457
§ 371 (c)(1),
(2) Date: Aug. 17, 2016

(87) PCT Pub. No.: WO2015/124044
PCT Pub. Date: Aug. 27, 2015

(65) Prior Publication Data
US 2017/0050882 A1 Feb. 23, 2017

(30) Foreign Application Priority Data

Feb. 24, 2014 (CN) .......................... 2014 1 0060998
Aug. 22, 2014 (CN) .......................... 2014 1 0416928

(51) Int. Cl.
| | | |
|---|---|---|
| C04B 7/345 | (2006.01) | |
| C04B 28/06 | (2006.01) | |
| C04B 7/32 | (2006.01) | |
| C04B 22/06 | (2006.01) | |
| C04B 22/10 | (2006.01) | |
| C04B 22/12 | (2006.01) | |
| C04B 24/04 | (2006.01) | |
| C04B 28/18 | (2006.01) | |
| C04B 40/06 | (2006.01) | |
| C04B 103/12 | (2006.01) | |
| C04B 103/22 | (2006.01) | |

(52) U.S. Cl.
CPC ............ *C04B 7/3453* (2013.01); *C04B 7/323* (2013.01); *C04B 22/062* (2013.01); *C04B 22/10* (2013.01); *C04B 22/124* (2013.01); *C04B 24/04* (2013.01); *C04B 28/065* (2013.01); *C04B 28/188* (2013.01); *C04B 40/0658* (2013.01); *C04B 2103/12* (2013.01); *C04B 2103/22* (2013.01); *Y02P 40/148* (2015.11); *Y02W 30/94* (2015.05)

(58) Field of Classification Search
CPC ........... C04B 7/345; C04B 7/32; C04B 40/06; C04B 24/04; C04B 22/06; C04B 22/10; C04B 22/12; C04B 28/18; C04B 7/3453; C04B 28/065; C04B 7/323; C04B 22/062; C04B 22/124; C04B 28/188; C04B 40/0658; C04B 2103/12; C04B 2103/22
See application file for complete search history.

(56) References Cited

U.S. PATENT DOCUMENTS

| | | | | |
|---|---|---|---|---|
| 2005/0126444 A1* | 6/2005 | Lopez-Gonzales | ....... | C04B 7/02 106/739 |
| 2007/0266903 A1* | 11/2007 | Gartner | ................... | C04B 7/323 106/693 |
| 2011/0308431 A1* | 12/2011 | Pasquier | ................. | C04B 7/323 106/693 |
| 2012/0145045 A1* | 6/2012 | Walenta | ................... | C04B 7/323 106/708 |
| 2013/0152825 A1* | 6/2013 | Ramirez Tovias | ........ | C04B 7/02 106/693 |
| 2013/0233207 A1* | 9/2013 | Marchi | ................... | C04B 7/323 106/693 |

FOREIGN PATENT DOCUMENTS

CN       102249576 A   * 11/2011

* cited by examiner

*Primary Examiner* — Anthony J Green
(74) *Attorney, Agent, or Firm* — Knobbe Martens Olson and Bear, LLP (57) ABSTRACT

The invention discloses a rapid-hardening high-belite calcium sulfoaluminate cement clinker and relates generally to a rapid-hardening high-belite calcium sulfoaluminate cement clinker and methods to use and to manufacture the clinker. The clinker of the present invention comprises 20% to 35% by weight of $C_4A_3\bar{S}$ 3% to 9% by weight of $C_4AF$, 37% to 47% by weight of $C_2S$, 0.5% to 4.6% by weight of f-CaO and 14% to 26.3% by weight of $CaSO_4$. The chemical compositions of the clinker are 12.9% to 16.1% by weight of $SiO_2$, 12% to 19% by weight of $Al_2O_3$, 1% to 3% by weight of $Fe_2O_3$, 49% to 54% by weight of CaO and 12% to 18.43% by weight of $SO_3$. It is manufactured by calcining, at a temperature of 1300° C.±50° C. in a rotary kiln, the raw meal, comprising 33% to 62% by weight of limestone, 10.5% to 28% by weight of fly ash, and 19% to 45% by weight of FGD gypsum. A group of rapid-hardening high-strength cements of various strength classes can be manufactured by mixing and grinding 26% to 97% by weight of clinker, 3% to 19% by weight of anhydrite and 0% to 55% by weight of granulated blast furnace slag.

21 Claims, 1 Drawing Sheet

RAPID-SETTING AND HARDENING, HIGH-BELITE SULFOALUMINATE CEMENT CLINKER AS WELL AS APPLICATION AND PRODUCTION PROCESS THEREOF

RELATED APPLICATIONS

This application is the U.S. National Phase under 35 U.S.C. §371 of International Application No. PCT/CN2015/070457 entitled RAPID-SETTING AND HARDENING, HIGH-BELITE SULFOALUMINATE CEMENT CLINKER AS WELL AS APPLICATION AND PRODUCTION PROCESS THEREOF, filed Jan. 9, 2015, designating the U.S.; which claims priority to Chinese Patent Application No. 201410416928.8, filed Aug. 22, 2014, and Chinese Patent Application No. 201410060998.4, filed Feb. 24, 2014. The contents of these related applications are herein expressly incorporated by reference in their entireties.

FIELD OF THE INVENTION

The invention relates generally to the field of construction and building materials, and more particularly to a rapid-hardening high-belite calcium sulfoaluminate cement clinker and methods to use and to manufacture the clinker.

BACKGROUND OF THE INVENTION

In recent decades, high-belite calcium sulfoaluminate cement, which combines calcium sulfoaluminate of high early strength and belite, has become a hot research topic, since it has advantages of low energy consumption, of low carbon emission and of high performance. Many universities, institutions and companies have put a lot of effort into the research in high-belite calcium sulfoaluminate cement and achieved many research developments. Yet, there is no mass production of high-belite calcium sulfoaluminate cement. According to the literature, most high-belite calcium sulfoaluminate cement clinkers have a typical oxide composition by weight of about 10% $Al_2O_3$ and about 20% $SiO_2$. These high-belite calcium sulfoaluminate cement clinkers develop much lower early and later compressive strengths of cement paste than conventional calcium sulfoaluminate cement clinkers. This is because the raw meal design of high-belite calcium sulfoaluminate cement clinker follows the theory for calcium sulfoaluminate cement clinker; lime saturation factor Cm is set to be 1.0 and aluminum-to-sulfur ratio P is set to be 3.82, as for calcium sulfoaluminate cement clinker. Therefore, it is difficult to produce high-strength high-belite calcium sulfoaluminate cement clinker by using low-grade raw materials of high silicon and low aluminum. As the rapid development of China's industry, a large amount of industry wastes are disposed of in landfills or ponds, which causes serious environmental problems and a waste of resources High-belite calcium sulfoaluminate cement can consume various kinds of industry wastes in large quantity, and it is an innovative concept to produce new type of cement by using industry wastes. It is significant to improve the adaptability of raw materials and to product development in the field of high-belite calcium sulfoaluminate cement.

On the other hand, energy-saving and emission-reduction is an important state policy in China. There is an urgent need for housing industrialization. One of the core technologies is the standardization design and prefabrication of main components, such as beams, slabs and columns. The conventional prefabrication method is to use ordinary Portland cement and to steam-cure concrete. This method has several disadvantages of high energy cons wnption, of heavy pollution, of high labor intensity and of low production efficiency. To develop a low-cost rapid-hardening cement is significant for the sustainable development of construction industry by skipping steam curing, particularly with steam boiler using coal, by enabling automated production, by improving production efficiency and by energy-saving and emission-reduction.

Calcium sulfoaluminate cement is a special cement invented by Chinese researchers. The major constituent phases are calcium sulfoaluminate ($C_4A_3\bar{S}$) and belite ($C_2S$); the proportion of the former is about 60% to about 70% by weight, and the proportion of the former is 20% to 30% by weight. Since calcium sulfoaluminate cement has many advantages, such as rapid hardening, high strength, expansive, good frost resistance, low permeability and good resistance to steel corrosion, and it has many unique applications in special building material and concrete products. High-quality natural gypsum and bauxite are the raw materials for manufacturing calcium sulfoaluminate cements. As bauxite is getting scarce, the cost and price of calcium sulfoaluminate cement have increased greatly, which have resulted in a decreased use of the cement in engineering projects. Many manufacturers are facing operation difficulties, and there is an urgent need for developing a low-cost high-performance calcium sulfoaluminate cement, High-belite calcium sulfoaluminate cement has advantages of low energy consumption and of low carbon emission, and it has been recently become one of the hot research topics. In addition, another advantage of high-belie calcium sulfoaluminate cement is that it can be produced by using fly ash, FGD gypsum and other industry wastes, while the manufacture of calcium sulfoaluminate cement need high-quality gypsum and bauxite. As the rapid development of China's industry, a large amount of industry wastes are disposed of in landfills or ponds, which causes serious environmental problems and a waste of resources. This creates great potential to produce a new type of high-belite calcium sulfoaluminate cement by using industry wastes. The development of high-belite calcium sulfoaluminate cement is of great importance in energy-saving and emission-reduction and will bring new opportunities to cement industry.

Calcium sulfoaluminate cements was invented by the researchers at China Building Materials Academy nearly 40 years ago. Ordinary calcium sulfoaluminate cement clinker contains about 30% by weight of $Al_2O_3$ and about 10% by weight of $SiO_7$. The experimental results from Department of Cement Research at China Building Materials Academy revealed that as the $C_4A_3\bar{S}$ to $\beta$-$C_2S$ ratio of calcium sulfoaluminate cement clinkers decreases from 80:20 to 60:40 to 40:60, the 3-day compressive strength of cement pastes decreases by about 10 MPa successively. This indicates that the decrease of $Al_2O_3$ content and the increase of $SiO_2$ content in clinkers result in a large decrease in compressive strength proportionally. Using high-quality bauxite of high aluminum and low silicon is a main approach to manufacture high-quality calcium sulfoaluminate cement, which is in good agreement with the production experiences of many manufacturers. It has been become a hot research topic in the cement industry to use low-aluminum high-silicon bauxite to produce a high-quality calcium sulfoaluminate cement, which has a relatively high $\beta$-$C_2S$ content and is, therefore, called high-belite calcium sulfoaluminate cements. According to the literature, high-belite calcium sulfoaluminate cement clinkers develop much lower early and later compressive strengths of cement paste than conventional calcium sulfoaluminate cement clinkers. High-belite calcium sulfoaluminate cement develops mechanical properties relatively close to Portland cement and has no rapid-hardening feature as conventional calcium sulfoaluminate cement. The raw meal design of high-belite calcium sulfoaluminate cement clinker follows the theory for the raw meal design of calcium sulfoaluminate cement clinker; lime saturation factor Cm is set to be 1.0 and aluminum-to-sulfur ratio P is set to be 3.82. Consequently, it is difficult to produce high-strength high-belite calcium sulfoaluminate cement clinker by using low-grade bauxite of high silicon and low aluminum. The absence of a well-developed theory has led to a slow progress in this research field. In order to produce high-quality calcium sulfoaluminate cements by using industry wastes and low-grade raw materials, the conventional theory of clinker design should be improved.

P. K. Mehta from the United States has reported his research on a high-belite calcium sulfoaluminate cement clinker in "World Cement Technology", July/August 1978, page 144-160 and in "World Cement Technology", May 1980, page 166-177. The clinker comprises 20% by weight of ye'elimite ($C_4A_3\bar{S}$), 20% by weight of calcium sulfate ($CaSO_4$), 45% by weight of belite ($C_2S$), 15% by weight of tetracalcium alumino ferrite ($C_4AF$) and <0.5% by weight of f-CaO. The difference between Mehta's clinker and Chinese calcium sulfoaluminate cement clinker, called third series cement, is that the former has a relatively higher calcium sulfate content. The clinker No. 5 in Mehta's publication seemed to meet the requirement of $CO_2$ emission reduction and developed similar properties to Portland cement. However, the clinker invented by Mehta has never been available on the market and there is no report been published on its commercialization.

Lafarge, a French company, has disclosed a high-belite calcium sulfoaluminate cement clinker in Chinese patent CN102745918A. This clinker comprises the following major constituent phases: 5% to 25% by weight of $C_2A_X F_{(1-X)}$, 15% to 35% by weight of $C_4A_3\bar{S}$, 40% to 75% by weight of $C_2S$. Some minor components are added as additives in clinker calcination to tailor the properties of the clinker and to ensure that part of $C_2S$ exists in the formation of $\alpha$-$C_2S$. According to the experimental data in the patent, the early strength is relatively low and the later strength is not high as well. There is still a large gap between the properties of the clinker and the requirements of high performance.

Calcium sulfoaluminate cement is featured by rapid hardening and high strength, and the increase in long-term strength is, however, relatively small. Also, the production needs a large amount of high-quality bauxite, gypsum, limestone and other resources. In contrast, bauxite, limestone and other raw materials are not necessarily in high quality for the production of high-belite calcium sulfoaluminate cement. However, current high-belite calcium sulfoaluminate cements have mechanical properties relatively close to Portland cement and have no features of rapid hardening and high early and later strengths as conventional calcium sulfoaluminate cements. The cement industry has been looking forward to a high-performance high-belite calcium sulfoaluminate cement, which can be manufactured by using massive industry wastes, is of low cost, of low energy consumption and of low $CO_2$ emission and shows faster hardening and higher early and later strengths than calcium sulfoaluminate cements. This is also one of the major technique difficulties in the cement industry.

DETAILED DESCRIPTION OF THE INVENTION

The invention discloses a rapid-hardening high-belite calcium sulfoaluminate cement clinker and methods to use and to manufacture the clinker. Beyond the conventional design method for calcium sulfoaluminate cement, it is an innovative concept to introduce a proper amount of f-CaO and $CaSO_4$ and to utilize the interaction between f-CaO, $C_4A_3\bar{S}$, $C_2S$ and $CaSO_4$ to accelerate each other's reaction. This technology generates a new type of rapid-hardening high-belite calcium sulfoaluminate cement clinker, having 2-hour, 4-hour and 28-day compressive strengths of 23.5 MPa, 27.6 MPa and 73 MPa, respectively. Furthermore, with the clinker, a rapid-hardening high-belite calcium sulfoaluminate cement and its manufacturing method are developed. The invention achieves a technology to produce high-strength rapid-hardening high-belite calcium sulfoaluminate cement, which is of low cost, of low energy consumption and of low $CO_2$ emission.

The invention discloses a technology to produce high-performance high-belite calcium sulfoaluminate cement by utilizing the high reactivity of the clinker, the interaction between f-CaO, $C_4A_3\bar{S}$, $C_2S$ and $CaSO_4$ in hydration process and the activation of added supplementary cementitious materials. The high-belite calcium sulfoaluminate cement shows high performance of rapid-hardening, high later strength, good workability, good frost resistance, good resistance to corrosion and low permeability, and the 2-hour, 7-day and 28-day compressive strengths reach 25.6 MPa, 58.6 MPa and 92.7 MPa, respectively.

The names of constituent phases and the abbreviations used herein are as follows: calcium sulfoaluminate ($C_4A_3\bar{S}$), dicalcium silicate ($C_2S$), tetracalcium alumino ferrite ($C_4AF$), calcium titanate (CT), free lime (f-CaO), gehlenite ($C_2AS$) and dodecacalcium hepta-aluminate ($C_{12}A_7$).

The mineral compositions in the clinker of the invention can be calculated as follows:

$$w(C_4A_3\bar{S}) = 1.99[w(Al_2O_3) - 0.64w(Fe_2O_3)]$$

$$w(C_2S) = 2.87w(SiO_2)$$

$$w(C_4AF) = 3.04w(Fe_2O_3)$$

$$w(CaSO_4) = 1.7[w(SO_3) - 0.13w(C_4A_3\bar{S})]$$

$$w(CT) = 1.7w(TiO_2)$$

$$w(f\text{-}CaO) = w(CaO) - 0.55[w(Al_2O_3) - 0.64w(Fe_2O_3)] - 1.87w(SiO_2) - 1.4w(Fe_2O_3) - 0.7[w(TiO_2) + w(SO_3)]$$

The modulus values for designing the high-belite calcium sulfoaluminate cement clinker can be expressed as follows:

$$\text{Lime saturation factor: } Cm = \frac{w(CaO) - 0.7[w(TiO_2) + w(SO_3)]}{1.87w(SiO_2) + 0.55[w(Al_2O_3) - 0.64w(Fe_2O_3)] + 0.4w(Fe_2O_3)}$$

-continued $$\text{Aluminum-to-sulfur ratio: } P = \frac{w(Al_2O_3) - 0.64w(Fe_2O_3)}{w(SO_3)}$$

In order to solve the aforementioned technical difficulties, the following measures apply in the present invention:

1. Clinker

The rapid-hardening high-belite calcium a sulfoaluminate cement clinker comprises the following major constituent phases: $C_4A_3\bar{S}$, $C_4AF$, $C_2S$ and $CaSO_4$. In particular, the clinker contains 0.5% to 4.6% by weight of f-CaO.

The clinker comprises 20% to 35% by weight of $C_4A_3\bar{S}$, 3% to 9% by weight of $C_4AF$, 37% to 47% by weight of $C_2S$, 0.5% to 4.6% by weight of f-CaO and 14% to 26.3% by weight of $CaSO_4$. The rest are minor additional phases.

The clinker comprises ≤7% by weight of minor additional phases.

The minor additional phases of the clinker include MgO, $CaOTiO_2$, $Na_2SO_3$ or $K_2SO_3$ or the nixture of two or more these minerals.

The clinker comprises the following major components: 12.9% to 16.1% by weight of $SiO_2$, 12% to 19% by weight of $Al_2O_3$, 1% to 3% by weight of $Fe_2O_3$, 49% to 54% by weight of CaO and 12% to 18.43% by weight of $SO_3$. The rest are minor additional components.

The clinker comprises ≤4% by weight of minor additional components.

The minor additional components of the clinker include MgO, $TiO_2$, $Na_2O$ or $K_2O$ or the mixture of two or more these oxides.

2. A Manufacturing Method for the Clinker

The manufacturing method includes the following steps:

(1) Preparation of raw materials: prepare the raw materials in the proportions of 33% to 62% by weight of limestone, 10.5% to 28% by weight of fly ash and 19% to 45% by weight of FGD gypsum.

(2) Preparation of raw meal: the raw materials in (1) are ground and homogenized to yield raw meal with a specified fineness.

(3) Calcination: the clinker is made by calcining, in a rotary kiln, the raw meal prepared in (2) at a temperature of 1300° C.±50° C.

The limestone as in "(1) preparation of raw materials" can be partly or fully replaced by alkaline residue from chlor-alkali industry, steel slag or carbide slag, or by the mixture of two or three of them; the type and replacement ratio need be controlled to ensure that the clinker contains 49% to 54% by weight of CaO.

The fly ash as in "(1) preparation of raw materials" can be partly or fully replaced by bauxite, tailing of bauxite, coal gangue, kaolin, fluidized bed combustion slag or clay, or by the mixture of two or more of them; the type and replacement ratio need be controlled to ensure that the clinker contains 12% to 19% by weight of $Al_2O_3$.

The FGD gypsum as in "(1) preparation of raw materials" can be partly or fully replaced by anhydrite, gypsum, fluorgypsum, hemihydrate gypsum, phosphogypsum, aluminum sulfate or the industry wastes rich in $CaSO_4$, or by the mixture of two or more of them; the type and replacement ratio need be controlled to ensure that the clinker contains 12% to 18.43% by weight of $SO_3$.

3. A Rapid-Hardening High-Belite Calcium Sulfoaluminate Cement Made of the Clinker (1) The cement is made by mixing and grinding the clinker, set-controlling strength-modifying agent and supplementary cementitious material, wherein it is characterized in that:

i. The clinker is the rapid-hardening high-belite calcium sulfoaluminate cement clinker; the set-controlling strength-modifying agent is anhydrite; the supplementary cementitious material is GBF slag.

ii. The cement is made by mixing and grinding 26% to 97% by weight of the rapid-hardening high-belite calcium suffoalwninate cement clinker, 3% to 19% by weight of anhydrite, and 0% to 55% by weight of GBF slag.

iii. Based on the above composition, the proportions of clinker, anhydrite and GBF slag are tailored based on the experimental results of mini grinding mill tests to ensure that the ground cement has the following properties:

Initial setting time: 9 minutes to 30 minutes, final setting time: 11 minutes to 40 minutes, 2-hour flexural strength: 1.8 MPa to 4.6 MPa, 2-hour compressive strength: 4.9 MPa to 25.6 MPa, 28-day flexural strength: 6.3 MPa to 11.8 MPa, 28-day compressive strength: 45.1 MPa to 92.7 MPa, 28-day free expansion: 0.012% to 0.078%, 21-day restrained expansion in air: 0.001% to 0.033%, and 28-day restrained expansion in water: 0.009% to 0.055%.

(2) The clinker in the cement comprises the following constituent phases: 20% to 35% by weight of $C_4A_3\bar{S}$, 3% to 9% by weight of $C_4AF$, 37% to 47% by weight of $C_2S$, 0.5% to 4.6% by weight of f-CaO and 14% to 26.3% by weight of $CaSO_4$.

(3) The clinker in the cement comprises the following components: 12.9% to 16.1% by weight of $SiO_2$, 12% to 19% by weight of $Al_2O_3$, 1% to 3% by weight of $Fe_2O_3$, 49% to 54% by weight of CaO and 12% to 18.43% by weight of $SO_3$.

(4) The anhydrite in the cement can be partly or fully replaced by FGD gypsum, gypsum, hemihydrate gypsum, phosphogypsum or fiuorgypsum, or by the mixture of two or more of them; the type and replacement ratio need be controlled to ensure that the effect of these materials to the performance of said cement keeps the same.

(5) The GMF slag in the cement can be partly or fully replaced by fly ash, steel slag, tailing of iron ore, limestone, dolomite or sandstone, or by the mixture of two or more of them; the type and replacement ratio need be controlled to ensure that the effect of these materials to the performance of said cement keeps the same.

4. A Manufacturing Method for the Rapid-Hardening High-Belite Calcium Sulfoaluminate Cement (1) The manufacturing method includes the following steps:

i. Preparation of raw meal: 33% to 62% by weight of limestone is ground in a raw mill and then mixed with 10.5% to 28% by weight of fly ash and 19% to 45% by weight of FGD gypstun; the raw materials is air-separated and homogenized to yield the raw meal.

ii. Manufacturing of the clinker: the raw meal prepared as in (1) is calcined at a temperature of 1300° C.±50° C. in a rotary kiln to yield the clinker, wherein it contains 0.5% to 4.6% by weight of f-CaO.

iii. Manufacturing of cement: according to the targeted strength class, the clinker used for manufacturing the cement is selected; with the chemical compositions of clinker, set-controlling strength-modifying agent and supplementary cementitious material, the proportions of clinker, set-controlling strength-modifying agent and supplementary cementitious material are designed for mini grinding mill tests; based the experimental results of mini grinding mill tests and experiences, the proportions of clinker, set-controlling strength-modifying agent and supplementary cementitious material are determined, and the cement is made by mixing and grinding the constituents into powder with a specific surface area of ≥450 m$^2$/kg (Blaine value).

(2) Before mixing and grinding as in step (3) of the manufacturing method, 0.1% to 0.3% by weight of $Li_2CO_3$ is added into the cement in order to shorten setting time and to improve early strength.

(3) In step (3) of the manufacturing method, 0.2% to 0.5% by weight of citric acid is added into the cement in order to prolong setting time and to improve later strength.

(4) The $Li_2CO_3$ added into the cement can be partly or fully replaced by LiOH or LiCl.

(5) The citric acid added into the cement can be partly or fully replaced by sodium citrate or sodium gluconate.

5. A High Later-Strength High-Belite Calcium Sulfoaluminate Cement Made of the Clinker In the experimental work of manufacturing the rapid-hardening high-belite calcium sulfoaluminate cement by mixing and grinding clinker, set-controlling strength-modifying agent and supplementary cementitious material, it was found that the decrease in the clinker proportion in the cements results in reduced rapid-hardening performance and a decreased early strength of the cement. The cement with a low clinker content can, however, develop a relatively high later-strength when having proper proportions of clinker, set-controlling strength-modifying agent and supplementary cementitious material. This implies that the new type of constituent phases in the rapid-hardening high-belite calcium sulfoaluminate cement clinker has high reactivity, and the activation of clinker, set-controlling strength-modifying agent and supplementary cementitious material by each other plays an important role.

The high-belite calcium sulfoaluminate cement with a low clinker content is, therefore, one of the significant findings of the invention.

In manufacturing the high-belite calcium sulfoaluminate cement, the proportions by weight of the rapid-hardening high-belite calcium sulfoaluminate cement clinker, anhydrite and GBF slag are 5% to 12%, 17% to 18% and 71% to 78%, respectively.

For the targeted strength class, the proportion of clinker is determined in the range of 5% to 12% by weight. Based on the experimental results of mini grinding mill tests, the proportions of anhydrite and GBF slag are tailored within the predefined range to ensure that the cement has the following properties: initial setting time of ≤43 minutes, final setting time of ≤53 minutes, 28-day flexural strength of 11.9 MPa to 12.8 MPa, 28-day compressive strength of 79 MPa to 82.5 MPa, 28-day free expansion of 0.10% to 0.12%, 21-day restrained expansion in air of 0.001% to 0.002% and 28-day restrained expansion in water of 0.017% to 0.022%.

The breakthrough innovation of the invention is that a small amount of f-CaO is introduced in the clinker as one of the essential constituent phases. According to the existing theory, in order to form more $C_3S$ in Portland cement clinker, the content of f-CaO is not allowed to exceed 1.5% by weight. A high f-CaO content may also cause the soundness problems of Portland cement. In calcium sulfoaluminate cement clinker the content of f-CaO is not allowed to exceed 0.2% by weight, since too much f-CaO will influence the hardening of cement paste and may lead to flash setting. The existing knowledge suggests that the presence of f-CaO is detrimental to the performance of Portland cement and calcium sulfoaluminate cement. The rapid-hardening high-belite calcium sutfoaluminate cement clinker of the invention contains 0.5% to 4.6% by weight of f-CaO, which is far beyond the limitation for Portland cement clinker and conventional calcium sulfoaluminate cement clinker. The presence of f-CaO in rapid-hardening high-belite calcium sulfoaluminate cement clinker has, however, been proved by experimental studies to be beneficial. First of all, enough f-CaO can reduce the formation of low-reactivity minerals (such as $C_2AS$) due to the lack of calcium in the calcination of clinker. Second of all, at early stage of cement hydration a small amount of f-CaO accelerates the hydration of calcium sulfoaluminate and accelerates the setting and hardening of cement paste, which is same as the action of f-CaO in calcium sulfoaluminate cement clinkers. Since calcium sulfoaluminate cement clinkers contain a large amount of $C_4A_3\bar{S}$ with high reactivity, ranging 60% to 70% by weight, a very small amount of f-CaO can cause very quick setting and rapid loss of workability. However, since the rapid-hardening high-belite calcium sulfoaluminate cement clinker of the invention contains 20% to 35% by weight of $C_4A_3\bar{S}$ and 37% to 47% by weight of $C_2S$ having little contribution to early strength, the activation effect f-CaO is needed to make the cement having the rapid setting and hardening performance. On the other hand, the f-CaO in the clinker of the invention, formed at a relatively low calcination temperature of 1300° C.±50° C., has a smaller crystal size and porous crystal structure and, therefore, high reactivity. The small amount of f-CaO in the clinker gets completely hydrated in a short period and does not cause any volume stability and soundness problems in later stage. On the other hand, supplementary cementitious materials, such as GBF slag, fly ash and steel slag, are ground with the clinker. In hydration process f-CaO in the clinker reacts with $Al_2O_3$, $Fe_2O_3$ and $SiO_2$ in these supplementary cementitious materials and $SO_3$ in gypsum to produce calcium sulfoaluminate hydrate, aluminum hydroxide gel and calcium silicate hydrate gel. This reaction enhances the reactivity of GBF slag, fly ash or steel slag, contributes to the early strength of cement paste and prevents the expansion due to the later hydration of f-CaO. The experimental studies have provided the volume change data of the cement manufactured by the above method: 28-day free expansion varying in a small range of 0.012% to 0.078%, 7-day restrained expansion in water of 0.005% to 0.040%, 28-day restrained expansion in water of 0.009% to 0.055% and 21-day restrained expansion in air of 0.001% to 0.033%. The expansion and shrinkage values are both very small, and the difference between the expansion in water and the shrinkage in air is, therefore, small. In general, the cements of the invention have relatively small volume changes and thus good performance in cracking control and water permeability.

This is the first time in mass production calcium sulfate is introduced in cement clinkers as a constituent phase, the cement clinker of the invention containing 14% to 26.3% by weight of $CaSO_4$. The large amount of $CaSO_4$ improves burnability of raw materials and lowers clinkering temperatures. The melting of $CaSO_4$ increases the amount of liquid phase at clinking temperatures and accelerates the diffusion of components through the liquid, which results in accelerated and more complete clinkering reactions. $C_2S$ and $C_4AF$, in clinkering process, dissolve in $SO_3$, forming solid solutions, and the reactivities of $C_2S$ and $C_4AF$ at early age are, therefore, greatly increased. Calcium sulfate phase itself can hydrate to form $CaSO_4.2H_2O$, contributing to hardening of cement paste. Calcium sulfate phase also reacts with calcium sulfoaluminate, another major constituent phase in the clinker, and water to form ettringite, a major hydration product at early stage, which accelerates setting and hardening.

The cement manufactured by the above method has specific surface areas in the range of 450 m²/kg to 520 m²/kg (Blaine value). Comprehensive studies on the physical properties, durability and compatibility to admixtures of the cement and on their applications in concrete and mortar products have been conducted. The applications of the cement of the present invention and calcium sulfoaluminate cements are basically the same. Compared to calcium sulfoaluminate cement, the cement of the present invention has a more pronounced feature of rapid setting and hardening. Chinese standard GB 20472-2006 "Calcium sulfoaluminate cements" specifies the 1-day compressive strength, while the cement of the present invention can achieve a compressive strength of 25.6 MPa within 2 hours. The cement of the present invention has better volume stability of proper expansion and lower shrinkage. Compared to calcium sulfoaluminate cement, concrete made of the cement of the present invention sets and hardens more rapidly and has better workability and improved surface texture.

The invention has the following advantages:

(1) The innovation of the invention is that a relatively large amounts of f-CaO and $CaSO_4$, exceeding the conventional limits, are introduced into the clinker of the invention, which is a breakthrough in the mineral composition design of calcium sulfoaluminate cement clinkers and provides with an approach to produce high-belite calcium sulfoaluminate cement clinkers of rapid hardening and high early and later strengths with low-grade raw materials of high silicon and low aluminum.

(2) In calcination, the clinkering temperature is decreased by 50° C., which results in reduced energy consumption and $CO_2$ emission and improved production environment.

(3) In the hydration process, the reactions of f-CaO, $C_4A_3\overline{S}$, $C_2S$ and $CaSO_4$ are accelerated by each other, and the resultant cements have the following good performance: rapid setting and hardening, high early and later strengths, proper expansion, low shrinkage, good frost resistance, low permeability and good resistance to sea water attack.

(4) A large amount of industry wastes can be used to manufacture both the clinker and the cement, and the proportion of industry wastes in raw materials exceeds 30%.

(5) The cost of raw materials is low.

The experimental study reveals that as the proportion of the clinker decreases, the cement has a decreased early strength and, however, a high compressive strength ranging from 79 MPa to 82.5 MPa at 28 days. In addition, the cement shows low heat evolution, excellent resistance to sea water attack, small volume change, which makes the cement very suitable for the engineering applications in marine environment, and it thus has a huge market potential.

By using the aforementioned manufacturing method, additives are not needed for manufacturing the cement of the invention. High performance high-belite calcium sulfoaluminate cements of various strength classes can be manufactured, according to the said method of the invention, by mixing and grinding the clinker of the invention, set-controlling strength-modifying agent and supplementary cementitious material. Since the manufacturing method and process control of the invention are well developed, the facility and desulfurization technology used have been proved environment-friendly. The significant decrease in clinkering temperature leads to a reduction of energy consumption. The utilization of a large amount of industry wastes has socioeconomic benefits of sustainable development and reduced production cost. The present invention is, therefore, a breakthrough innovation of the field.

BRIEF DESCRIPTION OF THE DRAWINGS

A flow chart of the manufacturing process of rapid-hardening high-belite calcium sulfoaluminate cements is provided in the accompanying FIGURE.

Figure 1:
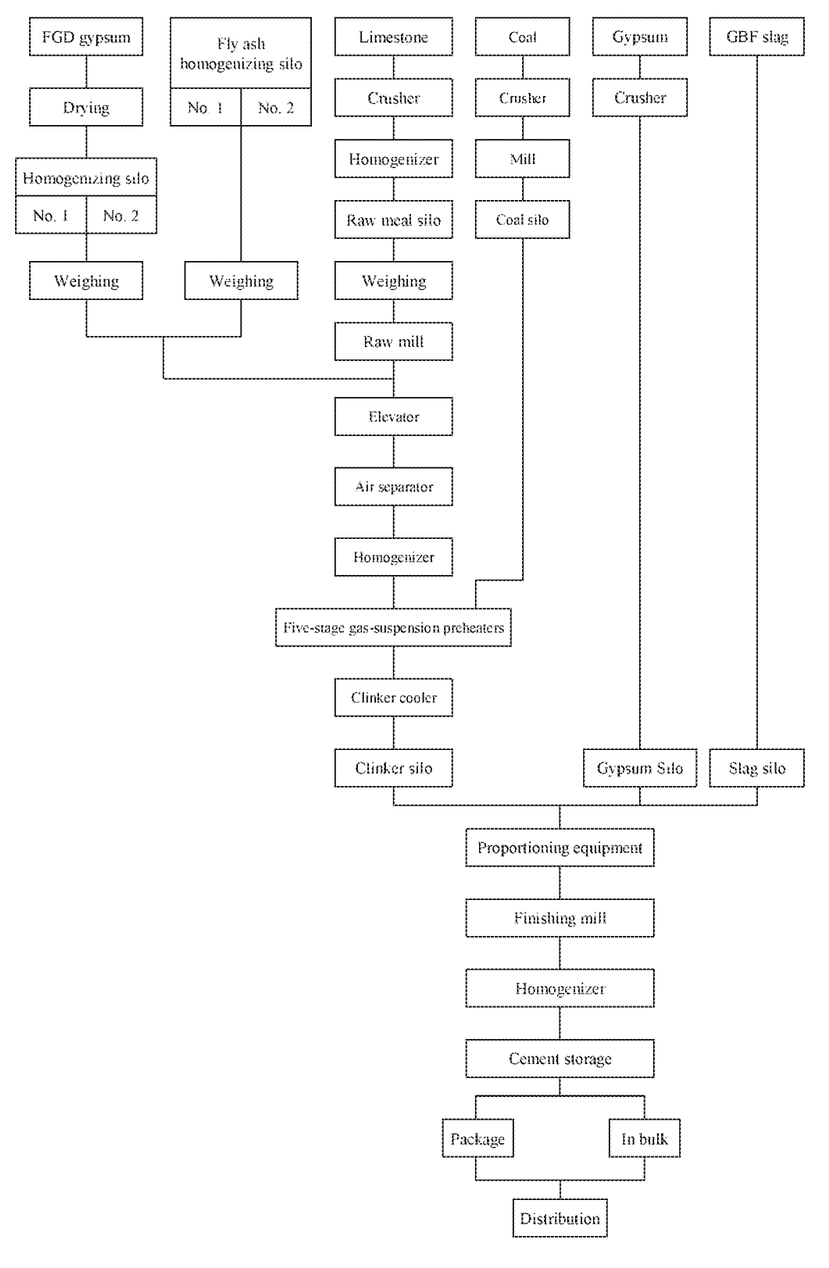

In the accompanying FIGURE, the manufacturing process of rapid-hardening high-belite calcium sulfoaluminate cement clinker is illustrated by taking the examples of the clinker, which is manufactured by using 33% to 62% by weight of limestone, 10.5% to 28% by weight of fly ash and 19% to 45% by weight of FGD gypsum; the manufacturing process of rapid-hardening high-belite calcium sulfoaluminate cement is illustrated by taking the examples of the cement, which is manufactured by mixing and grinding 26% to 97% by weight of the clinker, 3% to 19% by weight of anhydrite and 0% to 55% by weight of GBF slag.

EXAMPLES

The following examples illustrate the embodiments of the present invention.

Examples 1 to 6 give the proportion of raw materials for manufacturing clinkers.

(1) Preparation of raw meal. Table 1 gives the chemical compositions of raw materials. Limestone, fly ash and FGD gypsum are prepared in the proportions given in Table 2. Limestone is ground in a raw mill and is then conveyed, along with fly ash and FGD gypsum, to an air separator. After air separation, the raw materials with proper particle sizes are homogenized to yield raw meal, and the rest of the raw materials are conveyed back to the raw mill. In the process, fly ash and RID gypsum do not go to the raw mill before air separation, and the production of the raw mill, therefore greatly increases, leading to the reductions in both power consumption and abrasion of milling balls.

TABLE 1

Chemical compositions by weight of raw materials.

|  | LOSS | $SiO_2$ | $Al_2O_3$ | $Fe_2O_3$ | CaO | MgO | $SO_3$ |
| --- | --- | --- | --- | --- | --- | --- | --- |
| Limestone (wt. %) | 41.57 | 3.25 | 1.09 | 0.69 | 49.2 | 3.50 | 0.00 |
| FGD gypsum (wt. %) | 21.10 | 1.84 | 0.84 | 1.42 | 32.69 | 2.36 | 39.00 |
| Fly ash (wt. %) | 2.31 | 47.15 | 34.21 | 6.21 | 3.83 | 1.50 | 0.95 |

TABLE 2

Proportions of raw materials for manufacturing rapid-hardening high-belite calcium sulfoaluminate cement

| | Example 1 | Example 2 | Example 3 | Example 4 | Example 5 | Example 6 |
|---|---|---|---|---|---|---|
| Limestone (wt. %) | 62.0 | 33.0 | 35.0 | 55.3 | 52.0 | 62.0 |
| Fly ash (wt. %) | 13.5 | 24.0 | 20.0 | 25.7 | 28.0 | 10.5 |
| FGD gypsum (wt. %) | 24.5 | 43.0 | 45.0 | 19.0 | 20.0 | 27.5 |

(2) Manufacturing of clinker: the raw meal prepared as in (1) is calcined at a temperature of 1300° C.±50° C. in a rotary kiln with preheater to yield clinker. Calcination in a rotary kiln generates a small amount of $SO_2$ due to the presence of reductive gas. $SO_2$, along with other gases, goes into a preheater and then reacts with the feeding raw meal, preventing the escape of $SO_2$. As the decrease in clinkering temperature and coal consumption, the formation and emission of nitrogen oxides are reduced. This is good for the accordance with environmental guidelines.

(3) Manufacturing of cement: the cement is made by mixing clinker, anhydrite and GBF slag in a proper proportion and grinding into powder with a specific surface area of ≥450 $m^2$/kg (Blaine value).

The flow chart of the manufacturing process is given in the accompanying FIGURE.

The flowability, water demand, setting times and compressive and flexural strengths of the clinkers are measured in accordance with Chinese standard GB 20472-2006 "Calcium sulfoaluminate cements". Table 3 lists the results of the clinkers from examples 1 to 6.

The initial setting times of the clinkers of the examples are all shorter than 16 minutes, and the final setting times are all shorter than 40 minutes. The maximum early compressive strength at 2 hours reaches 20.5 MPa. The experimental results indicate that the clinkers of the present invention have the feature of rapid hardening and have higher compressive and flexural strengths than calcium sulfoaluminate cement clinkers.

Examples 7 to 16 give the experimental results of the chemical compositions of the clinkers.

The rapid-hardening high-belite calcium sulfoaluminate cement clinkers of the present invention comprise the following major constituent phases: $C_4A_3\bar{S}$, $C_4AF$, $C_2S$ and $CaSO_4$, and the clinkers are characterized in containing 0.5% to 4.6% by weight of f-CaO. Table 4 gives the proportions of the constituent phases and the modulus values of the clinkers. Table 5 gives the chemical composition of the clinkers. Table 6 gives the physical and mechanical properties of the clinkers.

TABLE 3

Physical and mechanical properties of the rapid-hardening high-belite calcium sulfoaluminate cement clinkers

| | | Example 1 | Example 2 | Example 3 | Example 4 | Example 5 | Example 6 |
|---|---|---|---|---|---|---|---|
| Water/cement ratio | | 0.52 | 0.50 | 0.50 | 0.49 | 0.48 | 0.51 |
| Flowability (mm) | | 171 | 168 | 167 | 171 | 169 | 166 |
| Blaine value ($m^2$/kg) | | 474 | 479 | 471 | 473 | 472 | 475 |
| Water demand (%) | | 31.00 | 30.00 | 29.80 | 29.60 | 29.20 | 31.00 |
| Initial setting time (min) | | 9 | 13 | 12 | 13 | 16 | 12 |
| Final setting time (min) | | 13 | 16 | 14 | 16 | 21 | 15 |
| Flexural/ compressive strength (MPa) | 2 h | 2.7/12.8 | 2.6/11.3 | 1.9/8.2 | 4.6/20.5 | 4.3/20.3 | 1.8/8.7 |
| | 4 h | 4.0/17.2 | 3.1/15.0 | 2.8/13.0 | 4.4/23.9 | 4.4/23.1 | 2.8/13.1 |
| | 1 d | 6.5/39.8 | 5.4/33.4 | 5.4/30.2 | 6.5/40.2 | 6.1/38.3 | 5.3/27.9 |
| | 3 d | 6.6/50.7 | 5.9/36.5 | 6.7/36.6 | 6.5/46.0 | 6.0/41.6 | 5.6/33.8 |
| | 7 d | 6.8/51.0 | 6.0/38.6 | 6.8/39.4 | 6.7/48.0 | 7.2/51.5 | 6.2/38.2 |
| | 28 d | 7.0/60.0 | 7.1/54.8 | 6.7/47.1 | 7.0/65.2 | 7.3/67.2 | 6.4/45.4 |

TABLE 4

Proportions of the constituent phases and modulus values of the rapid-hardening high-belite calcium sulfoaluminate cement clinkers.

| | Example 7 | Example 8 | Example 9 | Example 10 | Example 11 | Example 12 | Example 13 | Example 14 | Example 15 | Example 16 |
|---|---|---|---|---|---|---|---|---|---|---|
| Proportions of constituent phases (percentage by weight) | | | | | | | | | | |
| $C_4A_3\bar{S}$ | 35.00 | 20.53 | 20.93 | 27.39 | 20.29 | 33.67 | 22.81 | 32.94 | 20.98 | 33.27 |
| $C_4AF$ | 5.11 | 8.00 | 7.05 | 7.45 | 9.00 | 3.00 | 3.04 | 4.77 | 8.06 | 4.99 |
| $C_2S$ | 43.31 | 45.52 | 47.00 | 37.0 | 43.68 | 45.20 | 44.54 | 44.20 | 43.68 | 42.71 |
| f-CaO | 0.60 | 3.88 | 3.89 | 3.69 | 4.35 | 1.17 | 2.74 | 1.43 | 4.60 | 0.50 |

TABLE 4-continued

Proportions of the constituent phases and modulus values of the rapid-hardening high-belite calcium sulfoaluminate cement clinkers.

| | Example 7 | Example 8 | Example 9 | Example 10 | Example 11 | Example 12 | Example 13 | Example 14 | Example 15 | Example 16 |
|---|---|---|---|---|---|---|---|---|---|---|
| $CaSO_4$ | 14.55 | 20.81 | 20.72 | 20.62 | 20.86 | 14.79 | 26.30 | 14.36 | 20.71 | 16.29 |
| Minor phases | 1.43 | 1.26 | 0.41 | 3.85 | 1.82 | 2.17 | 0.57 | 2.30 | 1.97 | 2.24 |
| Modulus values | | | | | | | | | | |
| Cm | 1.02 | 1.21 | 1.21 | 1.22 | 1.23 | 1.13 | 1.18 | 1.14 | 1.30 | 1.01 |
| P | 1.34 | 0.69 | 0.71 | 0.88 | 0.68 | 1.29 | 0.62 | 1.30 | 0.71 | 1.20 |

TABLE 5

Chemical composition of the rapid-hardening high-belite calcium sulfoaluminate cement clinkers.

| | Example 7 | Example 8 | Example 9 | Example 10 | Example 11 | Example 12 | Example 13 | Example 14 | Example 15 | Example 16 |
|---|---|---|---|---|---|---|---|---|---|---|
| Chemical composition (percentage by weight) | | | | | | | | | | |
| $SiO_2$ | 15.09 | 15.86 | 16.1 | 12.90 | 15.22 | 15.75 | 15.52 | 15.40 | 15.22 | 14.88 |
| $Al_2O_3$ | 19.00 | 12.00 | 12.00 | 15.33 | 12.09 | 17.56 | 12.10 | 17.56 | 12.24 | 17.77 |
| $Fe_2O_3$ | 1.68 | 2.63 | 2.32 | 2.45 | 3.00 | 1.00 | 1.00 | 1.57 | 2.65 | 1.64 |
| CaO | 50.01 | 54.00 | 53.32 | 49.78 | 52.99 | 49.00 | 52.35 | 50.42 | 52.99 | 49.54 |
| $SO_3$ | 13.11 | 14.91 | 14.91 | 15.69 | 14.91 | 13.08 | 18.43 | 12.00 | 14.91 | 13.91 |
| Minor oxides | 1.11 | 0.60 | 1.35 | 3.85 | 1.79 | 3.61 | 0.60 | 3.05 | 1.99 | 2.26 |
| Modulus values | | | | | | | | | | |
| Cm | 1.02 | 1.21 | 1.21 | 1.22 | 1.23 | 1.13 | 1.18 | 1.14 | 1.30 | 1.01 |
| P | 1.34 | 0.69 | 0.71 | 0.88 | 0.68 | 1.29 | 0.62 | 1.30 | 0.71 | 1.20 |

TABLE 6

Physical and mechanical properties of the rapid-hardening high-belite calcium sulfoaluminate cement clinkers.

| | | Example 7 | Example 8 | Example 9 | Example 10 | Example 11 | Example 12 | Example 13 | Example 14 | Example 15 | Example 16 |
|---|---|---|---|---|---|---|---|---|---|---|---|
| Water/cement ratio | | 0.47 | 0.52 | 0.53 | 0.51 | 0.54 | 0.48 | 0.52 | 0.49 | 0.55 | 0.47 |
| Flowability (mm) | | 167 | 172 | 167 | 175 | 171 | 168 | 165 | 170 | 167 | 173 |
| Blaine value ($m^2/kg$) | | 472 | 470 | 480 | 473 | 474 | 480 | 472 | 480 | 471 | 480 |
| Water demand (%) | | 29.00 | 31.00 | 31.20 | 29.20 | 32.00 | 29.20 | 30.20 | 29.80 | 34.00 | 28.60 |
| Setting time (min) | Initial | 16 | 9 | 9 | 10 | 7 | 13 | 11 | 13 | 7 | 18 |
| | Final | 20 | 12 | 14 | 14 | 11 | 17 | 14 | 17 | 10 | 23 |
| Flexural/compressive Strength (MPa) | 2 h | 4.3/23.5 | 1.3/5.5 | 1.3/5.0 | 3.4/14.2 | 1.3/3.9 | 4.0/19.1 | 1.5/6.2 | 3.8/17.0 | 1.1/3.7 | 4.1/20.7 |
| | 4 h | 4.5/27.6 | 2.4/11.1 | 2.5/11.0 | 3.9/19.5 | 2.3/10.6 | 4.3/25.6 | 2.7/12.4 | 4.2/21.7 | 2.3/10.1 | 4.5/25.6 |
| | 1 d | 6.4/40.7 | 4.5/25.1 | 4.4/24.6 | 5.8/38.7 | 4.4/24.8 | 6.2/38.5 | 4.9/27.0 | 5.8/35.9 | 4.2/22.6 | 6.3/40.1 |
| | 3 d | 6.6/44.6 | 4.7/29.6 | 4.6/30.2 | 5.9/45.4 | 4.5/28.9 | 6.3/42.8 | 5.1/32.4 | 6.0/40.2 | 4.5/28.6 | 6.3/42.8 |
| | 7 d | 7.6/55.6 | 5.6/38.0 | 5.5/37.3 | 6.9/51.9 | 5.4/37.1 | 7.3/53.1 | 6.0/36.6 | 7.0/48.7 | 5.2/34.8 | 7.4/52.2 |
| | 28 d | 7.8/73.0 | 6.2/44.5 | 6.2/43.2 | 7.1/60.7 | 6.0/42.8 | 7.5/69.3 | 6.3/44.3 | 7.0/64.6 | 6.0/42.2 | 7.7/70.0 |

The maximum 28-day compressive strength of the clinkers of the examples reaches 73 MPa, which is much higher than the published experimental results of the other existing high-belite calcium sulfoaluminate cement clinkers of low aluminum and high silicon.

Examples 17 to 35 illustrate the chemical compositions and the physical and mechanical properties of rapid-hardening high-belite calcium sulfoaluminate cements. In Examples 17 to 35, the clinker of Example 7 is used, and the cements are manufactured by the aforementioned method. Table 7 gives the chemical compositions of $CaSO_4$ sources and supplementary cementitious materials, which are added in step (2) of the manufacturing process. Tables 8 to 10 give the proportions of the cement components and the physical and mechanical properties of the cements of Examples 17 to 35. The expansion of the cements is measured in accordance with Chinese standard GB 23439-2009 "Expansive agents for concrete".

TABLE 7

Chemical compositions of anhydrite and GBF slag and their alternatives.

| | Chemical composition | | | | | | | | |
|---|---|---|---|---|---|---|---|---|---|
| | Loss | SiO$_2$ | Al$_2$O$_3$ | Fe$_2$O$_3$ | CaO | MgO | SO$_3$ | TiO$_2$ | Sum |
| Anhydrite | 6.02 | 0.94 | 0.30 | 0.12 | 38.95 | 1.55 | 51.74 | — | 99.62 |
| FGD gypsum | 19.42 | 1.07 | 0.67 | 1.04 | 32.80 | 1.80 | 42.87 | — | 99.67 |
| Hemihydrate gypsum | 9.17 | 1.26 | 1.05 | 0.17 | 38.07 | 4.04 | 45.88 | — | 99.64 |
| Phosphogypsum | 19.41 | 2.17 | 3.60 | 0.96 | 32.92 | 1.24 | 40.34 | — | 100.64 |
| Fluorgypsum | 3.04 | 0.52 | 0.21 | 0.10 | 41.93 | 0.24 | 53.42 | — | 99.46 |
| Gypsum | 22.31 | 0.82 | 0.29 | 0.15 | 32.49 | 3.01 | 40.25 | — | 99.32 |
| GBF slag | −1.57 | 33.35 | 15.40 | 1.11 | 39.27 | 8.02 | — | — | 95.58 |
| Steel slag | −0.52 | 12.39 | 5.07 | 26.66 | 37.02 | 10.58 | — | — | 91.20 |
| Tailing of iron ore | 2.72 | 72.73 | 4.86 | 12.75 | 3.30 | 2.01 | — | 0.66 | 99.03 |
| Limestone | 41.61 | 3.60 | 1.23 | 0.50 | 49.87 | 2.51 | — | — | 99.32 |
| Dolomite | 46.29 | 0.12 | 0.53 | 0.19 | 30.25 | 21.63 | — | — | 99.01 |
| Sandstone | 1.53 | 93.14 | 2.31 | 1.10 | 0.87 | 0.11 | — | — | 99.06 |

TABLE 8-A

| | Proportion % | | | | | | | | | | | |
|---|---|---|---|---|---|---|---|---|---|---|---|---|
| Examples | Clinker | Anhydrite | FGD gypsum | Hemihydrate | Phosphogypsum | Fluorgypsum | Gypsum | GBF slag | Fly ash | Steel slag | Tailing of iron ore | Limestone |
| 17 | 97 | 3 | 0 | 0 | 0 | 0 | 0 | 0 | 0 | 0 | 0 | 0 |
| 18 | 88 | 0 | 10 | 0 | 0 | 0 | 0 | 2 | 0 | 0 | 0 | 0 |
| 19 | 66 | 15 | 0 | 0 | 0 | 0 | 0 | 19 | 0 | 0 | 0 | 0 |
| 21 | 66 | 15 | 0 | 0 | 0 | 0 | 0 | 0 | 19 | 0 | 0 | 0 |
| 22 | 66 | 0 | 0 | 0 | 0 | 0 | 15 | 0 | 0 | 0 | 0 | 0 |
| 23 | 54 | 15 | 0 | 0 | 0 | 0 | 0 | 31 | 0 | 0 | 0 | 0 |
| 25 | 54 | 15 | 0 | 0 | 0 | 0 | 0 | 0 | 0 | 0 | 31 | 0 |
| 26 | 54 | 15 | 0 | 0 | 0 | 0 | 0 | 19 | 0 | 12 | 0 | 0 |
| 27 | 54 | 0 | 0 | 0 | 15 | 0 | 0 | 31 | 0 | 0 | 0 | 0 |
| 28 | 54 | 5 | 0 | 10 | 0 | 0 | 0 | 31 | 0 | 0 | 0 | 0 |
| 29 | 54 | 0 | 0 | 0 | 0 | 15 | 0 | 31 | 0 | 0 | 0 | 0 |
| 31 | 34 | 16 | 0 | 0 | 0 | 0 | 0 | 50 | 0 | 0 | 0 | 0 |
| 32 | 26 | 19 | 0 | 0 | 0 | 0 | 0 | 55 | 0 | 0 | 0 | 0 |

| | Proportion % | | | | | | Blaine | Water | Setting time (min) | |
|---|---|---|---|---|---|---|---|---|---|---|
| Examples | Dolomite | Sandstone | Citric acid | Li$_2$CO$_3$ | w/c ratio | Flowability (mm) | value (m$^2$/kg) | demand (%) | Initial | Final |
| 17 | 0 | 0 | 0 | 0 | 0.50 | 167 | 480 | 34.2 | 11 | 14 |
| 18 | 0 | 0 | 0 | 0 | 0.48 | 167 | 450 | 31.6 | 15 | 18 |
| 19 | 0 | 0 | 0 | 0 | 0.44 | 172 | 480 | 25.1 | 50 | 76 |
| 21 | 0 | 0 | 0 | 0 | 0.46 | 174 | 485 | 25.8 | 20 | 29 |
| 22 | 19 | 0 | 0 | 0 | 0.47 | 175 | 490 | 26.8 | 24 | 31 |
| 23 | 0 | 0 | 0 | 0 | 0.42 | 174 | 473 | 25.2 | 11 | 14 |
| 25 | 0 | 0 | 0 | 0 | 0.44 | 168 | 495 | 26 | 14 | 20 |
| 26 | 0 | 0 | 0 | 0 | 0.44 | 175 | 480 | 27 | 12 | 18 |
| 27 | 0 | 0 | 0 | 0 | 0.45 | 175 | 500 | 30.6 | 16 | 21 |
| 28 | 0 | 0 | 0 | 0 | 0.47 | 172 | 485 | 30.6 | 9 | 11 |
| 29 | 0 | 0 | 0 | 0 | 0.46 | 169 | 500 | 29.8 | 12 | 18 |
| 31 | 0 | 0 | 0 | 0 | 0.41 | 175 | 510 | 25 | 21 | 26 |
| 32 | 0 | 0 | 0 | 0 | 0.41 | 171 | 520 | 24.8 | 24 | 31 |

TABLE 8-B

| | Flexural/compressive strength (MPa) | | | | | | 28 d free expansion % | Restrained expansion % | | |
|---|---|---|---|---|---|---|---|---|---|---|
| | | | | | | | | In water | | In air |
| Examples | 2 h | 4 h | 6 h | 1 d | 7 d | 28 d | % | 7 d | 28 d | 21 d |
| 17 | 5.4/24.1 | 6.3/33.1 | 7.2/34.8 | 7.9/47 | 8.1/58.7 | 8.3/67.9 | 0.012 | 0.005 | 0.009 | 0.001 |
| 18 | 5.5/25.6 | 6.8/33.2 | 7.7/46.4 | 7.9/51.2 | 8.0/55.1 | 8.2/60.6 | 0.017 | 0.006 | 0.012 | 0.001 |
| 19 | 2.0/4.3 | 3.5/15.3 | 4.8/18.3 | 5.1/30.2 | 7.3/58.6 | 9.3/92.7 | 0.070 | 0.025 | 0.050 | 0.022 |
| 21 | 2.5/7.3 | 5.1/19.8 | 5.2/19.5 | 5.4/31.1 | 7.1/55.5 | 8.3/86.6 | 0.078 | 0.040 | 0.054 | 0.030 |
| 22 | 2.1/5.9 | 4.8/18.5 | 5.1/18.9 | 5.4/31.0 | 5.8/37.9 | 6.9/59.9 | 0.036 | 0.022 | 0.028 | 0.002 |
| 23 | 3.4/11.4 | 3.7/16.6 | 4.3/18.8 | 4.7/20.8 | 6.4/42.1 | 8.7/68.3 | 0.038 | 0.022 | 0.028 | 0.003 |
| 25 | 2.8/9.0 | 3.1/11.3 | 3.7/14.0 | 4.2/17.4 | 5.5/33.9 | 6.9/58.9 | 0.034 | 0.021 | 0.027 | 0.012 |

TABLE 8-B-continued

| Examples | Flexural/compressive strength (MPa) | | | | | | 28 d free expansion % | Restrained expansion % | | |
| | | | | | | | | In water | | In air |
| | 2 h | 4 h | 6 h | 1 d | 7 d | 28 d | | 7 d | 28 d | 21 d |
|---|---|---|---|---|---|---|---|---|---|---|
| 26 | 4.0/12.0 | 4.7/18.0 | 5.0/20.0 | 6.7/31.0 | 7.8/47.6 | 8.0/63.0 | 0.072 | 0.040 | 0.055 | 0.033 |
| 27 | 2.6/8.1 | 2.9/10.2 | 3.5/13.6 | 4.0/16.5 | 5.3/32.1 | 6.3/45.1 | 0.020 | 0.010 | 0.015 | 0.003 |
| 28 | 4.3/17.6 | 5.0/19.7 | 5.6/34.9 | 7.0/37.6 | 8.0/50.9 | 8.3/65.0 | 0.024 | 0.015 | 0.020 | 0.002 |
| 29 | 3.1/12.0 | 3.4/13.2 | 3.9/14.0 | 4.3/19.2 | 5.8/36.7 | 7.3/45.6 | 0.031 | 0.017 | 0.024 | 0.001 |
| 31 | 2.2/5.9 | 2.4/9.9 | 2.9/11.0 | 3.1/13.2 | 9.6/62.6 | 11.8/81.7 | 0.034 | 0.018 | 0.026 | 0.004 |
| 32 | 1.8/4.9 | 2.2/8.0 | 2.6/10.2 | 3.1/12.3 | 8.3/58.1 | 10.9/81.0 | 0.045 | 0.016 | 0.025 | 0.002 |

Table 8 gives the examples of rapid-hardening high-belite calcium sulfoaluminate cements, and the data of Examples 20, 24 and 30, which contains additives, are listed in Table 9.

Table 9 gives the properties of the rapid-hardening high-belite calcium sulfoaluminate cements with additives, including accelerator and/or retarder. The data of Examples 20, 24 and 30 with the additives are listed in Table 9. The experimental results indicate that the addition of the additives has an impressive effect on the properties of the cements.

The further research reveals that the decrease in the proportion of the clinker has a negative effect on early strength and, however, results in a dramatic increase in later strength. This implies that it is necessary to continue the research on the innovative technology of the invention.

Table 10 gives more embodiments of high-belite calcium sulfoaluminate cement. In Examples 33 to 35, the clinker proportion in the cements is decreased greatly. Although the decrease in clinker content has a negative effect on the early-stage properties of rapid selling and hardening, the later strength increases dramatically. Without any addition of additives, the 28-day flexural strength can be up to 11.9 MPa to 12.8 MPa, and the 28-day compressive strength can be up to 79.0 MPa to 82.5 MPa. The restrained expansion test reveals that the cements still have a feature of expansion. This provides a chance to further product development and application exploration.

TABLE 9-A

| | Proportion % | | | | | | | | | | |
|---|---|---|---|---|---|---|---|---|---|---|---|
| Examples | Clinker | Anhydrite | FGD gypsum | Hemihydrate | Phosphogypsum | Fluorgypsum | Gypsum | GBF slag | Fly ash | Steel slag | Tailing of iron ore | Limestone |
| 20 | 66 | 15 | 0 | 0 | 0 | 0 | 0 | 0 | 0 | 0 | 0 | 18.5 |
| 24 | 54 | 15 | 0 | 0 | 0 | 0 | 0 | 18.7 | 0 | 0 | 0 | 0 |
| 30 | 54 | 15 | 0 | 0 | 0 | 0 | 0 | 17.7 | 10 | 3 | 0 | 0 |

| | Proportion % | | | | | | Blaine value | Water demand | Setting time (min) | |
|---|---|---|---|---|---|---|---|---|---|---|
| Examples | Dolomite | Sandstone | Citric acid | $Li_2CO_3$ | w/c ratio | Flowability (mm) | ($m^2$/kg) | (%) | Initial | Final |
| 20 | 0 | 0 | 0.5 | 0 | 0.45 | 175 | 498 | 26.8 | 22 | 28 |
| 24 | 0 | 12 | 0 | 0.3 | 0.43 | 174 | 478 | 25.2 | 8 | 10 |
| 30 | 0 | 0 | 0.2 | 0.1 | 0.43 | 171 | 495 | 26.3 | 12 | 18 |

TABLE 9-B

| Examples | Flexural/compressive strength (MPa) | | | | | | 28 d free expansion (%) | Restrained expansion (%) | | |
| | | | | | | | | In water | | In air |
| | 2 h | 4 h | 6 h | 1 d | 7 d | 28 d | | 7 d | 28 d | 21 d |
|---|---|---|---|---|---|---|---|---|---|---|
| 20 | 2.2/6.1 | 4.8/18.7 | 5.0/19.0 | 5.2/30.9 | 5.9/40.0 | 7.8/63.3 | 0.035 | 0.036 | 0.052 | 0.028 |
| 24 | 4.6/18.3 | 5.3/20.6 | 5.9/36.3 | 7.3/39.2 | 7.4/46.7 | 7.5/47.8 | 0.020 | 0.019 | 0.023 | 0.002 |
| 30 | 4.2/13.1 | 4.9/19.2 | 5.2/23.6 | 6.9/32.8 | 7.6/45.7 | 7.6/56.5 | 0.020 | 0.024 | 0.025 | 0.003 |

TABLE 10-A

| Examples | Clinker | Anhydrite | FGD gypsum | Hemihydrate | Proportion % Phosphogypsum | Fluorgypsum | Gypsum | GBF slag | Fly ash | Steel slag | Tailing of iron ore | Limestone |
|---|---|---|---|---|---|---|---|---|---|---|---|---|
| 33 | 12 | 17 | 0 | 0 | 0 | 0 | 0 | 71 | 0 | 0 | 0 | 0 |
| 34 | 8 | 17 | 0 | 0 | 0 | 0 | 0 | 75 | 0 | 0 | 0 | 0 |
| 35 | 5 | 17 | 0 | 0 | 0 | 0 | 0 | 78 | 0 | 0 | 0 | 0 |

| Examples | Dolomite | Sandstone | Citric acid | $Li_2CO_3$ | w/c ratio | Flowability (mm) | Blaine value ($m^2$/kg) | Water demand (%) | Setting time (min) Initial | Final |
|---|---|---|---|---|---|---|---|---|---|---|
| 33 | 0 | 0 | 0 | 0 | 0.40 | 170 | 490 | 26.4 | 33 | 46 |
| 34 | 0 | 0 | 0 | 0 | 0.40 | 173 | 495 | 26.5 | 38 | 49 |
| 35 | 0 | 0 | 0 | 0 | 0.39 | 171 | 500 | 26.6 | 43 | 53 |

TABLE 10-B

| Examples | Flexural/compressive strength (MPa) 2 h | 4 h | 6 h | 1 d | 7 d | 28 d | 28 d free expansion (%) | Restrained expansion (%) In water 7 d | 28 d | In air 21 d |
|---|---|---|---|---|---|---|---|---|---|---|
| 33 | 0 | 0.7/1.2 | 1.0/2.1 | 2.2/9.7 | 9.3/51.3 | 11.9/79.0 | 0.11 | 0.017 | 0.022 | 0.002 |
| 34 | 0 | 0 | 0.8/1.4 | 1.8/6.7 | 9.2/51.6 | 12.3/81.3 | 0.12 | 0.015 | 0.020 | 0.002 |
| 35 | 0 | 0 | 0.5/0.9 | 1.3/4.6 | 8.3/50.6 | 12.8/82.5 | 0.10 | 0.013 | 0.017 | 0.001 |

The anhydrite in these examples can be partly or fully replaced by FGD gypsum, gypsum, hemihydrate gypsum, phosphogypsum or fluorgypsurn, or by the mixture of two or more of them. The GBF slag can be partly or fully replaced by fly ash, steel slag, tailing of iron ore, limestone, dolomite or sandstone, or by the mixture of two or more of them. The type and replacement ratio need be controlled to ensure that the effect of these materials to the performance of said cement keeps the same. The key issue is that when choosing these materials, the content of effective components should be equivalent. The effective components for set controlling and strength modifying are crucial to the alternatives of anhydrite. The active components should be considered for supplementary cementitious materials. In the rapid-hardening high-belite calcium sulfoaluminate cements, ≤0.3% by weight of $L_2CO_3$ can be added to shorten setting time and to improve early strength. $Li_2CO_3$ can be partly or fully replaced by LiOH or LiCl. In the rapid-hardening high-belite calcium sulfoaluminate cements, ≤0.5% by weight of citric acid can be added to prolong setting time and to improve later strength. Citric acid can be partly or fully replaced by sodium citrate or sodium gluconate.

The invention claimed is:

1. A rapid-hardening high-belite calcium sulfoaluminate cement clinker, comprising $C_4A_3\bar{S}$ at a concentration of 20% to 35% by weight, 0.5% to 4.6% of f-CaO by weight, $C_4AF$, $C_2S$, and $CaSO_4$.

2. The rapid-hardening high-belite calcium sulfoaluminate cement clinker of claim 1, wherein said clinker comprises:
   20% to 35% by weight of $C_4A_3\bar{S}$,
   3% to 9% by weight of $C_4AF$,
   7% to 47% by weight of $C_2S$,
   0.5% to 4.6% by weight of f-CaO, and
   14% to 26.3% by weight of $CaSO_4$.

3. The rapid-hardening high-belite calcium sulfoaluminate cement clinker of claim 2, comprising ≤7% by weight of one or more additional components.

4. The rapid-hardening high-belite calcium sulfoaluminate cement clinker of claim 2, further comprising one or more additional components, and wherein the one or more additional components is selected from the group consisting of MgO, $CaO \cdot TiO_2$, $Na_2SO_3$, $K_2SO_3$, and any mixture of two or more thereof.

5. The rapid-hardening high-belite calcium sulfoaluminate cement clinker of claim 1, wherein said clinker comprises:
   12.9% to 16.1% by weight of $SiO_2$,
   12% to 19% by weight of $Al_2O_3$,
   1% to 3% by weight of $Fe_2O_3$,
   49% to 54% by weight of CaO, and
   12% to 18.43% by weight of $SO_3$.

6. The rapid-hardening high-belite calcium sulfoaluminate cement clinker of claim 5, comprising ≤4% by weight of one or more additional components.

7. The rapid-hardening high-belite calcium sulfoaluminate cement clinker of claim 5, further comprising one or more additional components, and wherein said one or more additional components is selected from the group consisting of MgO, $CaO \cdot TiO_2$, $Na_2SO_3$, $K_2SO_3$, and any mixture of two or more thereof.

8. The rapid-hardening high-belite calcium sulfoaluminate cement clinker of claim 1, wherein said clinker comprises 1.17% to 4.6% by weight of f-CaO.

9. A manufacturing method for the rapid-hardening high-belite calcium sulfoaluminate cement clinker, wherein said method comprises the following steps:
   (1) preparing raw materials: calculating the proportions of raw materials according to said components in claim 1, the raw materials comprise 33% to 62% by weight of limestone, 10.5% to 28% by weight of fly ash and 19% to 45% by weight of flue gas desulfurization (FGD) gypsum;

(2) preparing raw meal: grinding and homogenizing the raw materials in (1) to yield a raw meal with a specified fineness; and (3) calculating: calcining, in a rotary kiln, the raw meal prepared in (2) at a temperature of 1300° C.±50° C. to produce the clinker.

10. The manufacturing method of claim 9, wherein said limestone is partly or fully replaced by an alternative type of raw material selected from the group consisting of alkaline residue from chlor-alkali industry, steel slag, carbide slag, and any mixture thereof; and wherein the clinker produced in step (3) comprises 49% to 54% by weight of CaO.

11. The manufacturing method of claim 9, wherein said fly ash is partly or fully replaced by an alternative type of raw material selected from the group consisting of bauxite, tailing of bauxite, coal gangue, kaolin, fluidized bed combustion slag, clay, and any mixture thereof; and wherein the clinker produced in step (3) comprises 12% to 19% by weight of $Al_2O_3$.

12. The manufacturing method of claim 9, wherein said FGD gypsum is partly or fully replaced by an alternative type of raw material selected from the group consisting of anhydrite, gypsum, hemihydrate gypsum, phosphogypsum, fluorgypsum, aluminum sulfate, an industry waste rich in $CaSO_4$, and any mixture thereof; and wherein the clinker produced step (3) comprises 12% to 18.43% by weight of $SO_3$.

13. A rapid-hardening high-belite calcium sulfoaluminate cement having a predefined flexural and/or compressive strength, made by mixing and grinding a clinker, a set-controlling strength-modifying agent, and a supplementary cementitious material, wherein (1) said clinker is the rapid-hardening high-belite calcium sulfoaluminate cement clinker of claim 1; said set-controlling strength-modifying agent is an anhydrite; and said supplementary cementitious material is a granulated blast furnace (GBF) slag;

(2) said cement is made by mixing and grinding 26% to 97% by weight of the rapid-hardening high-belite calcium sulfoaluminate cement clinker, 3% to 19% by weight of the anhydrite, and 0% to 55% by weight of the GBF slag;

(3) the cement comprises the clinker in the range of 26% to 97% by weight; and the proportions of the anhydrite and the GBF slag are tailored according to the predefined flexural and/or compressive strength within said range as in (2) so that said cement has the following properties:

initial setting time: 9 minutes to 30 minutes, final setting time: 11 minutes to 40 minutes, 2-hour flexural strength: 1.8 MPa to 4.6 MPa, 2-hour compressive strength: 4.9 MPa to 25.6 MPa, 28-day flexural strength: 6.3 MPa to 11.8 MPa, 28-day compressive strength: 45.1 MPa to 92.7 MPa, 28-day free expansion: 0.012% to 0.078%, 21-day restrained expansion in air: 0.001% to 0.033%, and 28-day restrained expansion in water: 0.009% to 0.055%.

14. The rapid-hardening high-belite calcium sulfoaluminate cement of claim 13, wherein said anhydrite is partly or fully replaced by FGD gypsum, or gypsum, or hemihydrate gypsum, or phosphogypsum, or fluorgypsum, or any mixture thereof.

15. The rapid-hardening high-belite calcium sulfoaluminate cement of claim 13, wherein said GBF slag is partly or fully replaced by fly ash, or steel slag, or tailing of iron ore, or limestone, or dolomite, or sandstone, or any mixture thereof.

16. The high-belite calcium sulfoaluminate cement according to claim 13, made by mixing and grinding a clinker, a set-controlling strength-modifying agent and a supplementary cementitious material, wherein the proportions by weight of the rapid-hardening high-belite calcium sulfoaluminate cement clinker, the anhydrite, and the GBF slag are 5% to 12%, 17% to 18%, and 71% to 78%, respectively.

17. A manufacturing method for a rapid-hardening high-belite calcium sulfoaluminate cement having a predefined flexural and/or compressive strength, wherein said method comprises the following steps:

(1) preparing a raw meal: grinding 33% to 62% by weight of limestone in a raw mill and then mixing with 10.5% to 28% by weight of fly ash and 19% to 45% by weight of FGD gypsum to produce a raw material; air-separating and homogenizing the raw material to yield the raw meal;

(2) manufacturing of a clinker: calcining the raw meal at a temperature of 1300° C.±50° C. in a rotary kiln to yield the clinker, said clinker containing 0.5% to 4.6% by weight of f-CaO;

(3) manufacturing of a cement: according to the proportions as in (2) of claim 13 and the predefined flexural and/or compressive strength, selecting:

(i) the clinker used for manufacturing said cement,
(ii) the chemical compositions of the clinker,
(iii) the set-controlling strength-modifying agent and the supplementary cementitious material, and
(iv) the proportions of clinker, the set-controlling strength-modifying agent and the supplementary cementitious material; and mixing and grinding the selected clinker, set-controlling strength-modifying agent, and supplementary cementitious material in steps (3)(i)-(3)(iii) into powder with a specific surface area of ≥450 $m^2$/kg (Blaine value) to produce the cement.

18. The manufacturing method of claim 17, wherein before said mixing and grinding 0.1% to 0.3% by weight of $Li_2CO_3$ is added into said cement in order to shorten setting time and to improve early strength.

19. The manufacturing method of claim 17, wherein 0.2% to 0.5% by weight of citric acid is added into said cement in order to prolong setting time and to improve later strength.

20. The manufacturing method of claim 18, wherein said $Li_2CO_3$ is partly or fully replaced by LiOH or LiCl.

21. The manufacturing method of claim 19, wherein said citric acid is partly or fully replaced by sodium citrate or sodium gluconate.

* * * * *

UNITED STATES PATENT AND TRADEMARK OFFICE
CERTIFICATE OF CORRECTION

PATENT NO. : 9,822,036 B2
APPLICATION NO. : 15/119688
DATED : November 21, 2017
INVENTOR(S) : Zhenqiu Zhang Page 1 of 2

It is certified that error appears in the above-identified patent and that said Letters Patent is hereby corrected as shown below:

On the Title Page

Item (57), Abstract, Line 7, change "$C_4A_3\overline{S}$" to --$C_4A_3\overline{S}$,--.

In the Specification

Column 1, Line 55, change "resources" to --resources.--.

Column 2, Line 2, change "cons wnption," to --consumption,--.

Column 2, Line 14, change "former" to --latter--.

Column 2, Line 48, change "$SiO_7$." to --$SiO_2$.--.

Column 5, Line 2 (approx.), change "Aluminum to-sulfur ratio:" to --Aluminum-to-sulfur ratio:--.

Column 5, Line 10, after "calcium" delete "a".

Column 5, Line 22 (approx.), change "$CaOTiO_2$," to --$CaO \cdot TiO_2$,--.

Column 5, Line 22 (approx.), change "nixture" to --mixture--.

Column 6, Line 19, change "suffoalwninate" to --sulfoaluminate--.

Column 6, Line 45, change "fiuorgypsum" to --fluorgypsum--.

Column 6, Line 49, change "GMF" to --GBF--.

Signed and Sealed this
Fourth Day of February, 2020

Andrei Iancu
*Director of the United States Patent and Trademark Office*

CERTIFICATE OF CORRECTION (continued)
U.S. Pat. No. 9,822,036 B2

Column 6, Line 62, change "gypstun;" to --gypsum;--.

Column 8, Line 8, change "sutfoaluminate" to --sulfoaluminate--.

Column 8, Line 16, change "$C_2$ AS)" to --$C_2AS$)--.

Column 8, Line 28, change "$C_4A_3S$" to --$C_4A_3\overline{S}$--.

Column 10, Line 52 (approx.), change "RID" to --FGD--.

Column 18, Line 20, change "selling" to --setting--.

Column 19, Line 34 (approx.), change "fluorgypsurn" to --fluorgypsum--.

Column 19, Line 47 (approx.), change "$L_2CO_3$" to --$Li_2CO_3$--.

In the Claims

Column 19, Line 64, in Claim 2, change "7%" to --37%--.

Column 21, Line 29, in Claim 12, after "produced" insert --in--.

Column 22, Line 41, in Claim 17, change "agent" to --agent,--.